(12) United States Patent
Zelesky et al.

(10) Patent No.: US 6,241,467 B1
(45) Date of Patent: Jun. 5, 2001

(54) STATOR VANE FOR A ROTARY MACHINE

(75) Inventors: Mark F. Zelesky, Coventry, CT (US); Gary D. Steuber, Loveland, OH (US); Daniel E. Kane, Tolland; Brian Merry, Middletown, both of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/366,290

(22) Filed: Aug. 2, 1999

(51) Int. Cl.[7] ................. F01D 9/04; F01D 9/06
(52) U.S. Cl. ............. 415/115; 415/116; 416/97 R
(58) Field of Search ...................... 415/115, 116; 416/95, 96 R, 96 A, 97 R, 97 A

(56) References Cited

U.S. PATENT DOCUMENTS

| | | |
|---|---|---|
| 3,628,880 | 12/1971 | Smuland et al. . |
| 4,017,213 | 4/1977 | Przirembel . |
| 4,353,679 | 10/1982 | Hauser . |
| 4,688,988 | 8/1987 | Olsen . |
| 4,767,260 | 8/1988 | Clevenger et al. . |
| 4,946,346 | 8/1990 | Ito . |
| 5,399,065 | 3/1995 | Kudo et al. . |
| 5,413,458 | 5/1995 | Calderbank . |
| 5,486,090 | 1/1996 | Thompson et al. . |
| 5,488,825 | 2/1996 | Davis et al. . |
| 5,538,393 | 7/1996 | Thompson et al. . |

*Primary Examiner*—Christopher Verdier
(74) *Attorney, Agent, or Firm*—Gene D. Fleisehhauer

(57) ABSTRACT

A coolable stator vane 46 having a platform 48, 54 having internal cooling for the platform is disclosed. Various construction details are developed for cooling the interior of the platform in the trailing edge region 126, 146 of the platform. In one particular embodiment, the platform has a two-pass passage 168 in flow communication with the exterior of the platform, the rearmost pass 170 discharging more than half the cooling fluid entering the two pass passage.

21 Claims, 6 Drawing Sheets

STATOR VANE FOR A ROTARY MACHINE

CROSS REFERENCE TO RELATED APPLICATIONS

This application relates to copending U.S. application Ser. No. 09/365,488 entitled "Method For Forming a Cooling Passage and For Cooling A Turbine Section of a Rotary Machine", by Brian Merry.

DESCRIPTION

1. Technical Field

This invention relates to a stator vane having a cooled interior and more particularly to a stator vane having a coolable platform.

2. Background of the Invention

An axial flow rotary machine, such as a gas turbine engine for an aircraft, has a compression section, a combustion section, and a turbine section. An annular flow path for working medium gases extends axially through the sections of the engine.

The engine adds fuel to the working medium gases and burns the fuel in the combustion section to form hot, pressurized gases. The hot, working medium gases are expanded through the turbine section to extract energy as work from the gases. The energy is transferred to the compression section to raise the pressure of the incoming gases.

The turbine section includes a rotor for receiving this work from the hot working medium gases. The rotor extends axially through the engine. The rotor includes a rotor assembly in the turbine section. The rotor also has a rotor assembly in the compression section. The rotor assemblies have arrays of rotor blades which extend outwardly across the working medium flow path through which the gases are directed. Arrays of rotor blades in the turbine section receive energy from the hot, working medium gases and drive the rotor assembly at high speeds about an axis of rotation. Arrays of rotor blades in the compression section transfer energy to the working medium gases to compress the gases as the airfoils are driven about the axis of rotation by the rotor.

The engine includes a stator disposed about the rotor. The stator has stator assembly having an outer case. The outer case extends circumferentially about the working medium flow path to bound the flow path. The stator assembly has seal elements, such as a circumferentially extending seal member which is disposed radially about the rotor assembly. The seal member is formed of arcuate segments which permit the seal member to change diameter in response to operative conditions of the engine. The seal member is in close proximity to the tips of the rotor blades to form a seal that blocks the leakage of working medium gases from the flowpath.

The stator assembly also has arrays of stator vanes which extend radially inwardly across the working medium flow path. The stator vanes are commonly called vane clusters and have one or more airfoils or stator vanes. The stator vanes are disposed circumferentially about the axis A of the engine and are spaced apart by a small circumferential gap G.

The arrays of stator vanes are disposed upstream of the arrays of rotor blades in both the compression section and turbine section. The stator vanes guide the working medium gases as the gases are flowed along the flow path. Each has an airfoil which is designed to receive, interact with and discharge the working medium gases as the gases are flowed through the engine. The stator vanes have structure, such as an inner platform and an outer platform which bound the flow path for working medium gases.

The airfoils in the turbine section are bathed in hot working medium gases under operative conditions. Certain airfoils in the turbine section, such as stator vanes in the high pressure turbine, are cooled by flowing cooling air through the airfoil to avoid unacceptably high temperatures in the walls of the airfoil. Each stator vane has one or more large openings at its inner end and near its outer end near the outer case for receiving the cooling air.

A feather seal member, commonly called a feather seal, is typically provided in modern engines between each pair of circumferentially spaced stator vanes. The seal member bridges the gap G between the stator vanes to block the leakage of cooling air being supplied to the vane into the working medium flow path by flowing through the gap G. One example, such a coolable array of wall segments is shown in U.S. Pat. No. 4,767,260 issued to Clevenger et al., entitled "Stator Vane Platform Cooling Means". The feather seal slot typically extends into the vicinity of a rear rail for attaching the stator vane to adjacent structure. In some constructions, a radially extending feather seal is disposed in the rail. In another construction, a pair of feather seals are used to form a cooling air duct to flow cooling air between the feather seals to a downstream location as shown in U.S. Pat. No. 4,688,988 issued to Olsen and entitled "Coolable Stator Assembly for Gas Turbine Engine". The stator vane typically has many small cooling air holes which extend from the interior of the airfoil to the exterior of the airfoil. The cooling air holes cool the airfoil by convection and discharge cooling air at the gas path surface to provide film cooling to regions of the airfoil such as the leading edge region or the trailing edge region.

The wall segments of the outer air seal and the platforms of the stator vanes are in intimate contact with the hot working medium gases and receive heat from the gases in varying amounts over the surface of the platform. The outer air seal segments and the platforms of the turbine vanes are provided with cooling air from the openings which are in flow communication with internal cooling passages. One example is shown in U.S. Pat. No. 5,413,458 issued to Calderbank entitled "Turbine Vane With A Platform Cavity Having A Double Feed for Cooling Fluid." In Calderbank, the turbine vane includes a platform cavity having a first inlet located on the pressure side and a second inlet located on the suction side of the stator vane. A cooling passage extends rearwardly from both locations so that flow in the same direction toward the trailing edge of the platform. The flow provides convective cooling and film cooling by discharging cooling fluid through exit conduits such as film cooling holes which extend from the passage to flow surfaces on the platform.

An early example of a cooling scheme for a vane platform is shown in U.S. Pat. No. 3,628,880 issued to Smuland et al., entitled "Vane Assembly and Temperature Control Arrangement." U.S. Pat. No. 4,017,213 issued to Przirembel entitled "Turbomachinery Vane or Blade with Cooled Platforms" shows arrangements of small cooling conduits for providing a combination of impingement, convection and film cooling to the platform. The selective placing of the conduits includes a conduit which extends through the platform trailing edge for convectively cooling the trailing edge. U.S. Pat. No. 4,946,346 issued to Ito entitled "Gas Turbine Vane" shows a plurality of small conduits which extend through the trailing edge region and film cooling holes used in conjunction with the holes.

Serpentine passages have also been used for cooling outer air seals and for cooling turbine vanes. One example of an outer air seal construction having serpentine passages is shown U.S. Pat. No. 5,538,393 issued Thompson et al. entitled "Turbine Shroud Segment With Serpentine Cooling Channels Having a Bend Passage." In Thompson, the outer air seal is provided with a plurality of serpentine channels which extend between the sides of the outer air seal segment. A serpentine channel was also used in the U.S. Pat. No. 4,353,679 issued to Hauser, entitled "Fluid-Cooled Element." In Hauser, the serpentine channel extends rearwardly and from side to side creating a flowpath that moves from the trailing edge forwardly in the platform to discharge film cooling air which then flows rearwardly over the platform.

The above notwithstanding, scientists and engineers working under the direction of Applicants Assignee have sought to develop a relatively simple cooling passage for the trailing edge region of a platform for a stator vane for providing cooling to the platforms of stator vanes.

SUMMARY OF INVENTION

This invention is in part predicated on the recognition that edge regions of the platform for a stator vane near the suction side suffer particularly from heat transfer distress because of end wall effects in the flow in part created by the flow between the arrays of stator vanes. It is also predicated on the recognition that exhausted cooling air from one stator vane may be used to offset the cooling requirements for adjacent structure.

According to the present invention, a platform for a stator vane has a two pass passage for cooling fluid disposed in the trailing edge region of the vane, the passage extending toward the sides and turning back on itself reversing the flow with the endmost portion of the passage adjacent the trailing edge for receiving at least half the flow entering the passage and discharging the flow adjacent the gas path surface and through the trailing edge (as used herein, the term "flow" refers to the amount of cooling fluid that flows in a given period of time).

In accordance with one detailed embodiment of the present invention, the passage has a turn region adjacent the side of the platform which causes the passage to go through angles in the turn region whose summation exceeds one-hundred and eighty degrees.

In accordance with one embodiment of the present invention, the passage is oriented to impact flow against a wall of the passage angled to the flow to increase heat transfer in those regions.

In accordance with one detailed embodiment, the flow characteristics of exit conduits from the passage in flow communication with the exterior of the platform cause at least half the flow entering the portion of the passage adjacent the edge to exit past the trailing edge of the platform.

A primary feature of the present invention is a cooling passage having legs disposed in the trailing edge region of the airfoil. The legs have a flow path which extends in opposite directions toward the sides of the platform. In one detailed embodiment, a feature is a turn region between adjacent legs which causes the flow path to turn through a summation of angles which is greater than one hundred and eighty degrees (180) degrees. Another feature is a rib which extends across the passage and toward the oncoming flow. Still another feature is a leg of the passage which is parallel to the suction side and directed toward the trailing edge of the platform. Another feature is the ratio of areas of exit conduits to the cross sectional flow area of the passage and the flow characteristics of the conduits in the portion of the passage adjacent the trailing edge and upstream of the trailing edge.

A primary advantage of the present invention is the efficiency of the engine and durability of the stator vane which results from the effective use of cooling air fluid in the trailing edge region of the platform. Another advantage is the durability of the adjacent stator vane and the downstream rotor blades which results from directing cooling air as it exits the platform in jets to provide film cooing to the adjacent structure. Still another advantage is the increased heat transfer in critical regions of the platform which result from impacting the flow in the passage on walls in those regions to increase local heat transfer coefficients. Another advantage is the castability of the airfoil which results from use of a passage having a length, width, and two passes which promotes castability.

BEST MODE

Figure 1:
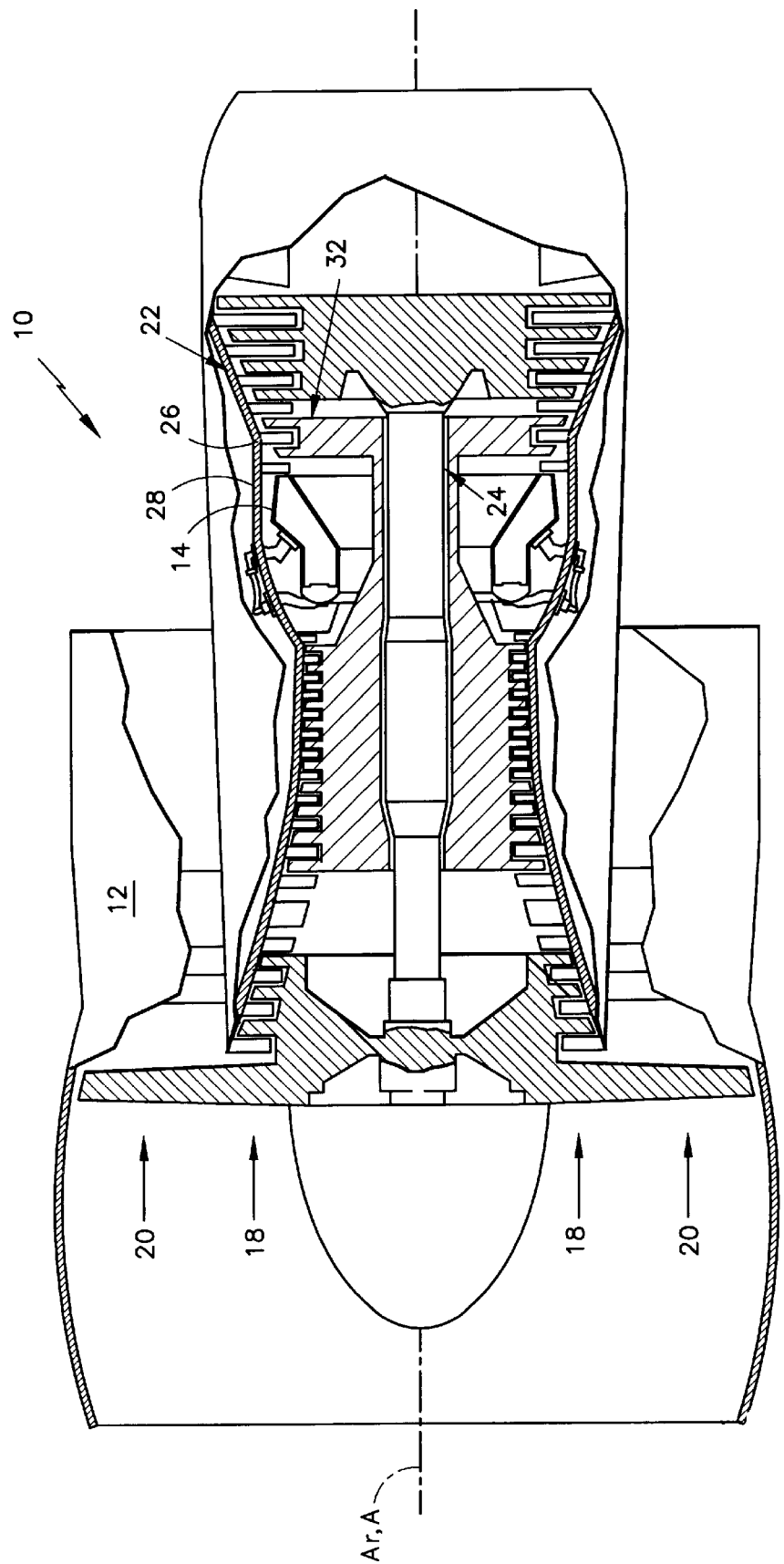
FIG. 1 is the side elevation view of a rotary machine such as a turbofan gas turbine engine having an axis of rotation Ar.

FIG. 1 is a schematic, side elevation view of a rotary machine 10, such as a turbofan gas turbine engine. The engine is disposed about an axis of symmetry A and has an axis of rotation Ar. The engine includes a compression section 12, a combustion section 14, and a turbine section 16. An annular, primary flowpath 18 for working medium gases extends axially through the sections of the engine. A by-pass flowpath 20 is outward of the primary flow path. The engine is partially broken away to show a stator 22 and a rotor 24 in the turbine section. The stator 22 includes a stator assembly 26 having an outer case 28 which extends circumferentially about the primary flowpath.

Figure 2:
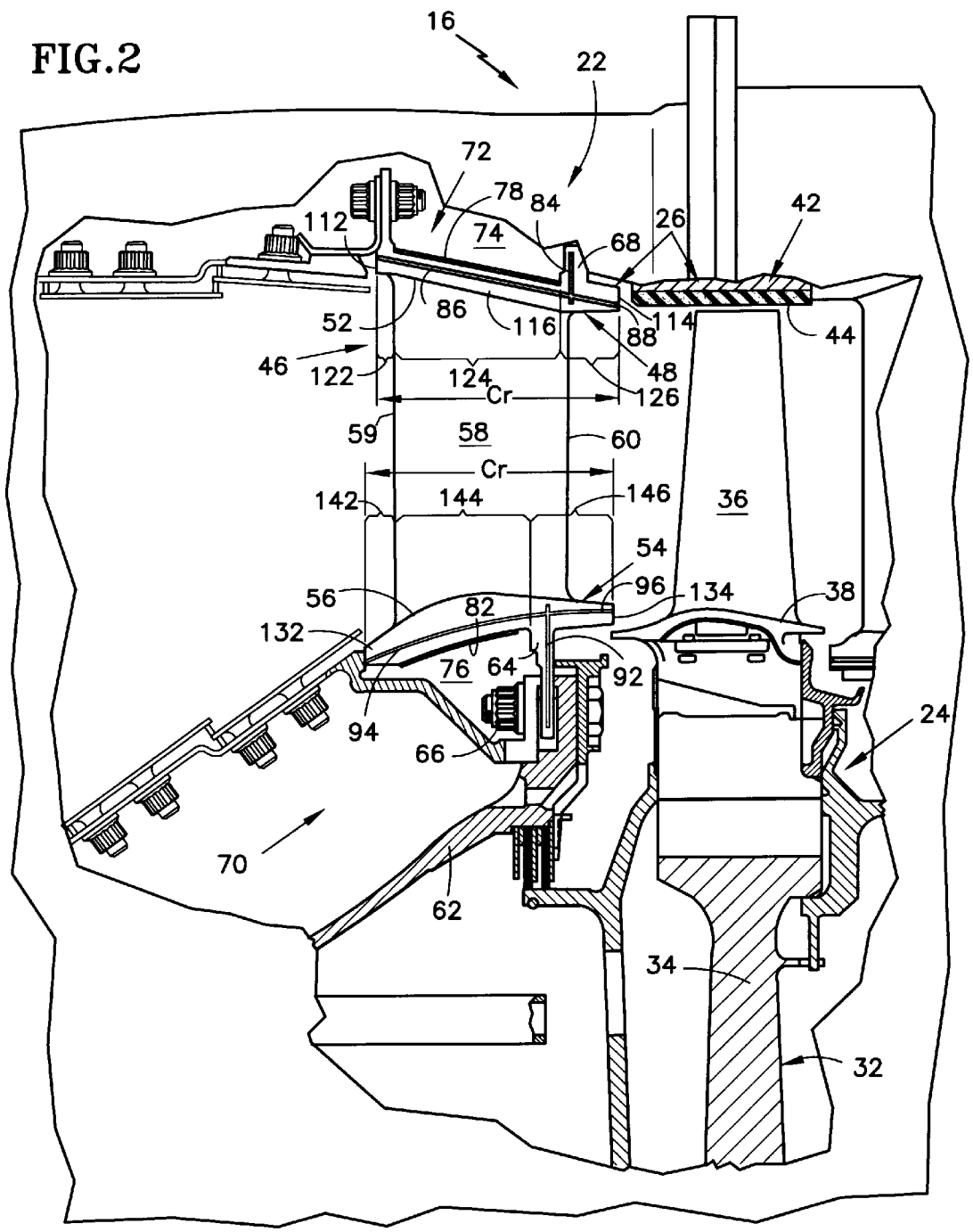
FIG. 2 is an enlarged side elevation view partly in cross section and partly in full showing a portion of the combustion section and turbine section of the gas turbine engine shown in FIG. 2 and shows an array of stator vanes in the turbine section.

FIG. 2 is an enlarged side elevation view of part of the turbine section 16 of FIG. 1. The rotor 24 includes a rotor assembly 32. The rotor assembly has a rotor disk 34 and an array or plurality of rotor blades (that is, an indefinite number of two or more) of rotor blades, as represented by the rotor blade 36. Each rotor blade has a platform 38. The platform inwardly bounds the working medium flowpath 18. The rotor blades extend radially outwardly across the working medium flow path into close proximity with the stator 22.

The stator 22 further includes a seal member 42. The seal member is supported from the outer case. The seal member is disposed in close proximity to the outermost portion of the rotor blades 36 and outwardly bounds the working medium flowpath 18. The seal member is formed of a plurality of arcuate outer air seal segments, as represented by the arcuate segment 44. Each segment is spaced by a small circumferential gap (not shown) from the adjacent segment. The seal segments move inwardly and outwardly as the outer case 28 of the stator assembly 26 moves inwardly and outwardly in response to operative conditions of the engine. The segmented seal member 42 has very little hoop strength and provides decreased resistance to movement of the case 28 as compared to a seal member that is one piece and uninterrupted in the circumferential direction.

The stator assembly 26 extends circumferentially about the axes A and Ar. The stator assembly is commonly referred to as a case and vane assembly. The stator assembly includes an array of stator vane clusters, as represented by the cluster 46. The clusters are disposed circumferentially about the axis A. Each cluster is commonly referred to as a stator vane. The stator vane has an outer diameter platform 48 having a gas path surface 52 and an inner diameter platform 54 having a gas path surface 56. The gas path surfaces on the platforms extend circumferentially and axially to bound the working medium flowpath 18 in the radial direction. One or more airfoils, as represented by the airfoil 58, extend radially between the platforms across the working medium flow path. Each airfoil has a leading edge 59 and a trailing edge 60.

In addition to the outer case 28, the stator assembly includes an inner case 62. The stator vane has an inner rail 64 for positioning the stator vane from the inner case. Each stator vane is positioned from the inner case with bolts 66 which extend through the inner rail. The stator vane has one or more outer rails, as represented by the rail 68, for positioning the stator vane from the outer case. In the embodiment shown, each stator vane is positioned from the outer case with bolts, pins or lugs (not shown) as is known in the art which engage the outer rail.

The stator 22 has an inner diameter region 70 and an outer diameter region 72. The stator has a first annular plenum 74 for cooling fluid, such as cooling air from the compression section 12, which extends circumferentially about the outer diameter region 72. A second annular plenum 76 for cooling air extends circumferentially about the inner diameter region 70 of the stator. Each stator vane 46 has at least one opening in each end which places the interior of the vane in flow communication with the plenum for supplying cooling air to the vane. These openings are represented by the opening 78 adjacent the outer platform and the opening 82 adjacent the inner platform.

Figure 3:
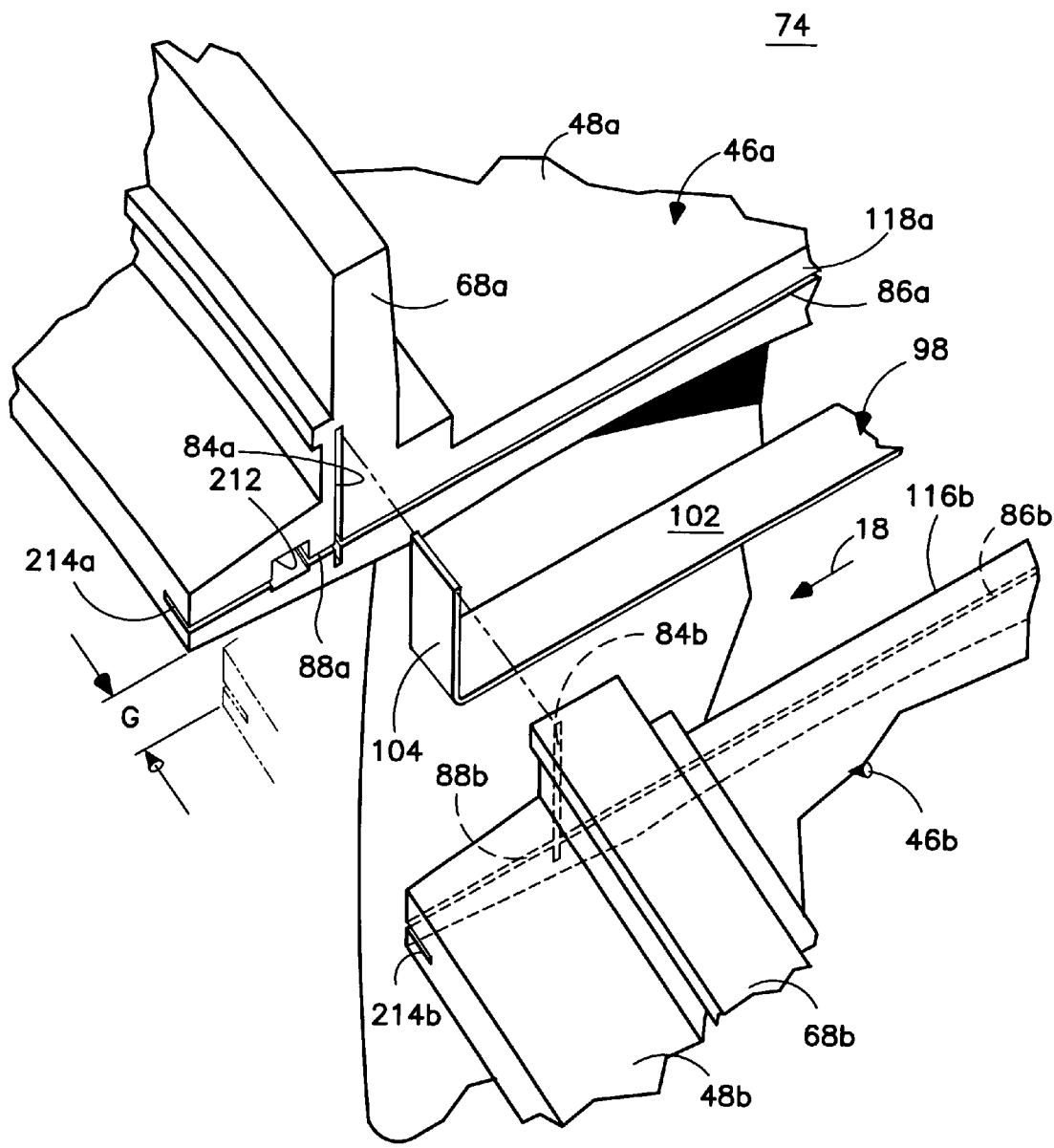
FIG. 3 is a perspective view of the outer platform shown in FIG. 2 showing the relationship of a feather seal member to slots formed in the pressure side and the suction side of adjacent stator vanes.

FIG. 3 is a perspective view of part of a pair of adjacent stator vanes 46a, 46b showing part of the outer platforms 48a, 48b with the installed position of platform 48b shown by the broken lines. As shown in FIG. 2 and FIG. 3, each platform of the stator vane 46 further has slots. The slots are represented by the feather seal slots 84, 86 and the extension slot 88 at the outer platform, and by the feather seal slots 92, 94 and the extension slot 96 at the inner platform 54. Pairs of feather seal slots in adjacent vanes face circumferentially for receiving an associated feather seal member, as represented by the feather seal member 98. Each feather seal member 98 extends between a pair of adjacent stator vanes 46a, 46b in the installed condition. The feather seal member has an axial leg 102 and a radial leg 104. The feather seal member slidably engages the associated stator vanes to provide sealing in the gap G between the adjacent vanes. The stator vanes and the feather seal members form, in effect, a circumferentially continuous barrier between the working medium flowpath 18 and the plenum 74 with the feather seal members closing the gap G and sliding on the vanes as the stator assembly moves inwardly and outwardly in response to operative conditions of the engine.

Figure 4:
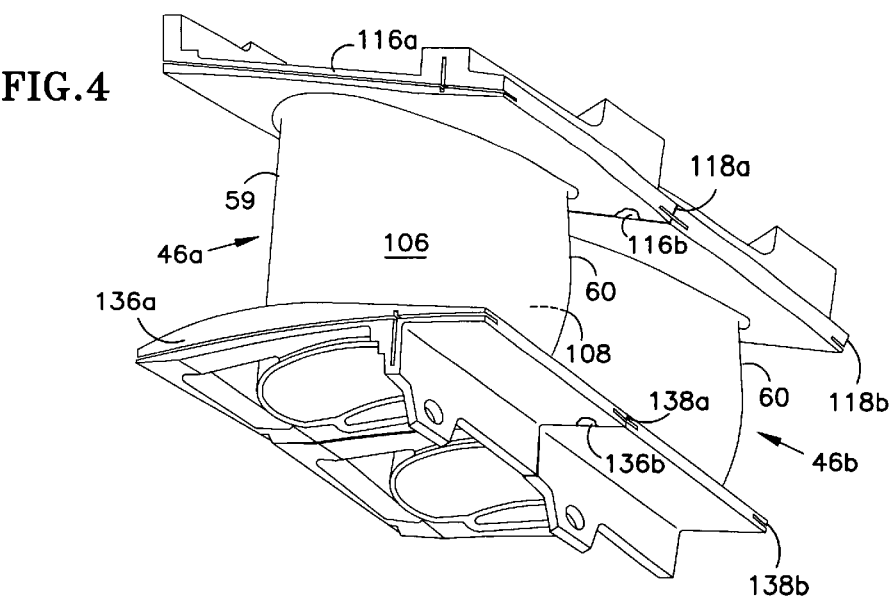
FIG. 4 is a perspective view of a pair of stator vanes of the type shown in FIG. 2.

FIG. 4 is a perspective view from below of the pair of adjacent stator vanes 46a, 46b. The airfoil 58 has flow directing surfaces which extend between the leading edge 59 and the trailing edge 60 such as a suction surface 106 and a pressure surface 108.

Figure 5:
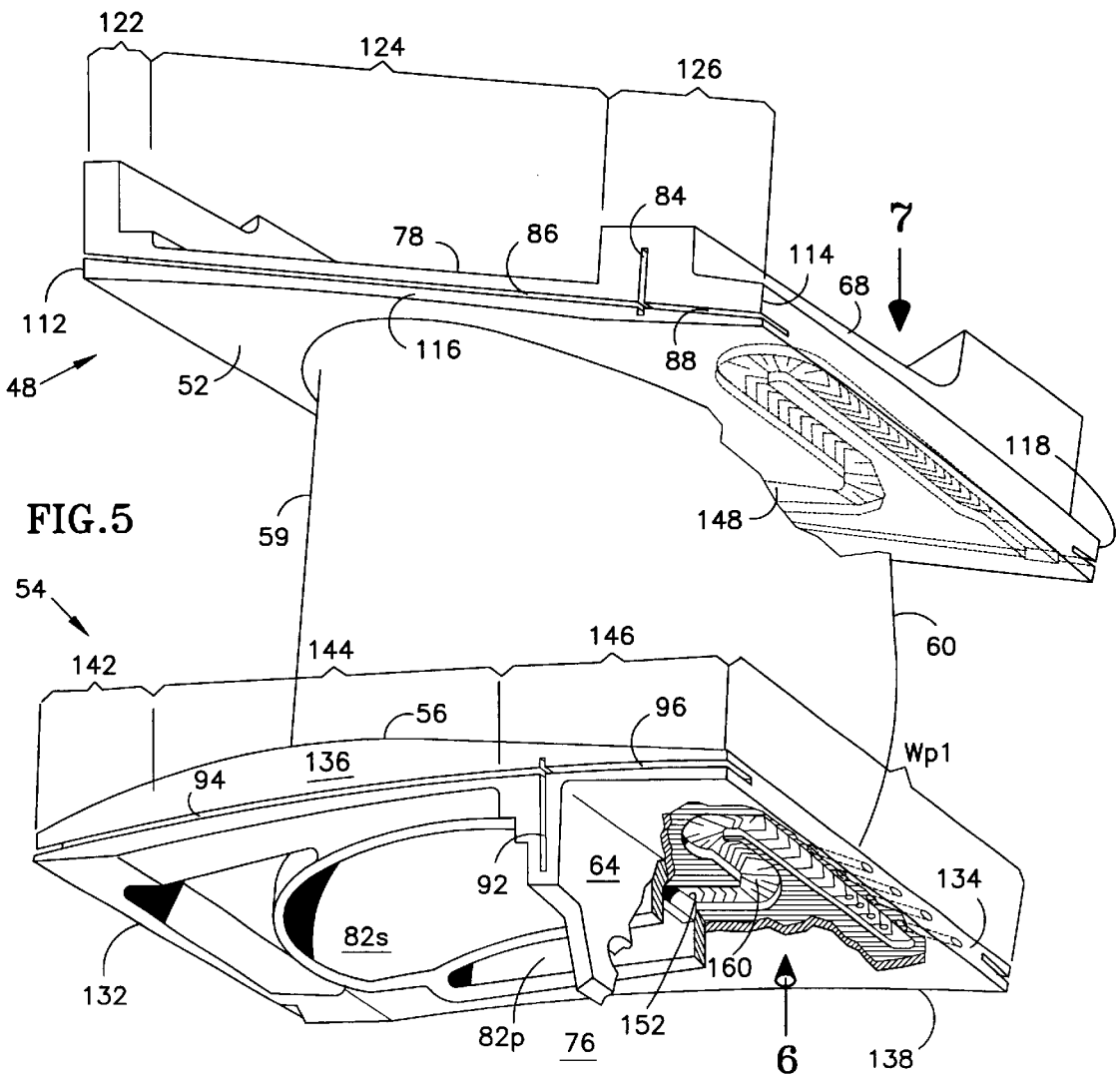
FIG. 5 is a perspective view partially in cross-section and partially broken away to show cooling passages disposed in the trailing edge region of the stator vanes shown in FIG. 4.

As shown in FIG. 2 and FIG. 5, the outer platform 48 has a leading edge 112. A trailing edge 114 is spaced axially from the leading edge by a distance Cr as measured perpendicular to the trailing edge. The leading edge and the trailing edge of the platform each lie in a radial plane which is perpendicular to the axis A of the engine in the installed condition. The platform has a suction side 116 and a pressure side 118. The suction side of one platform faces the pressure side of the adjacent platform. Each side extends between the leading edge and the trailing edge. The pressure side is spaced laterally from the suction side by a width Wpl. The width Wpl is measured along a line parallel to the trailing edge of the platform.

The outer platform 48 has a leading edge region 122 forward of the airfoil 58. The platform has a mid-chord region 124 from which the airfoil extends. The platform has a trailing edge region 126 aft of the midchord region. The trailing edge region of the platform extends rearwardly from the rearmost attachment rail 68 to the trailing edge.

The inner platform 54 has a leading edge 132. A trailing edge 134 which is spaced axially from the leading edge by a distance Cr as measured perpendicular to the trailing edge. The leading edge and the trailing edge of the platform each lie in a radial plane which is perpendicular to the axis A of the engine in the installed condition. The platform has a suction side 136 and a pressure side 138. The suction side of one platform faces the pressure side of the adjacent platform. Each side extends between the leading edge and the trailing edge. The pressure side is spaced laterally from the suction side by a width Wpl. The width Wpl is measured along a line parallel to the trailing edge of the platform. The width of the outer diameter platform Wpl and the width of the inner diameter platform Wpl are not equal.

The inner platform 54 has a leading edge region 142 forward of the airfoil 58. The platform has a mid-chord region 144 from which the airfoil extends. The platform has a trailing edge region 146 aft of the midchord region. The trailing edge region of the platform extends rearwardly from the rearmost attachment rail 64 to the trailing edge.

FIG. 5 is an enlarged perspective view of the stator vane 46 shown in FIG. 4 with portions of the vane broken away in the trailing edge regions 126, 146. The outer platform 48 has the outer opening 78 which is in flow communication with the outer plenum 74 for cooling air. The inner platform 54 has a suction side opening 82s and a pressure side opening 82p. Each of the openings 82s, 82p is in flow communication with the inner cooling air plenum 76. An internal opening 148 on the interior of the outer platform 48 and an internal opening 152 on the interior of the inner platform 54 in the trailing edge region 126, 146 of each platform places the respective trailing edge region in flow communication with the associated plenum for cooling air.

Figure 6A:
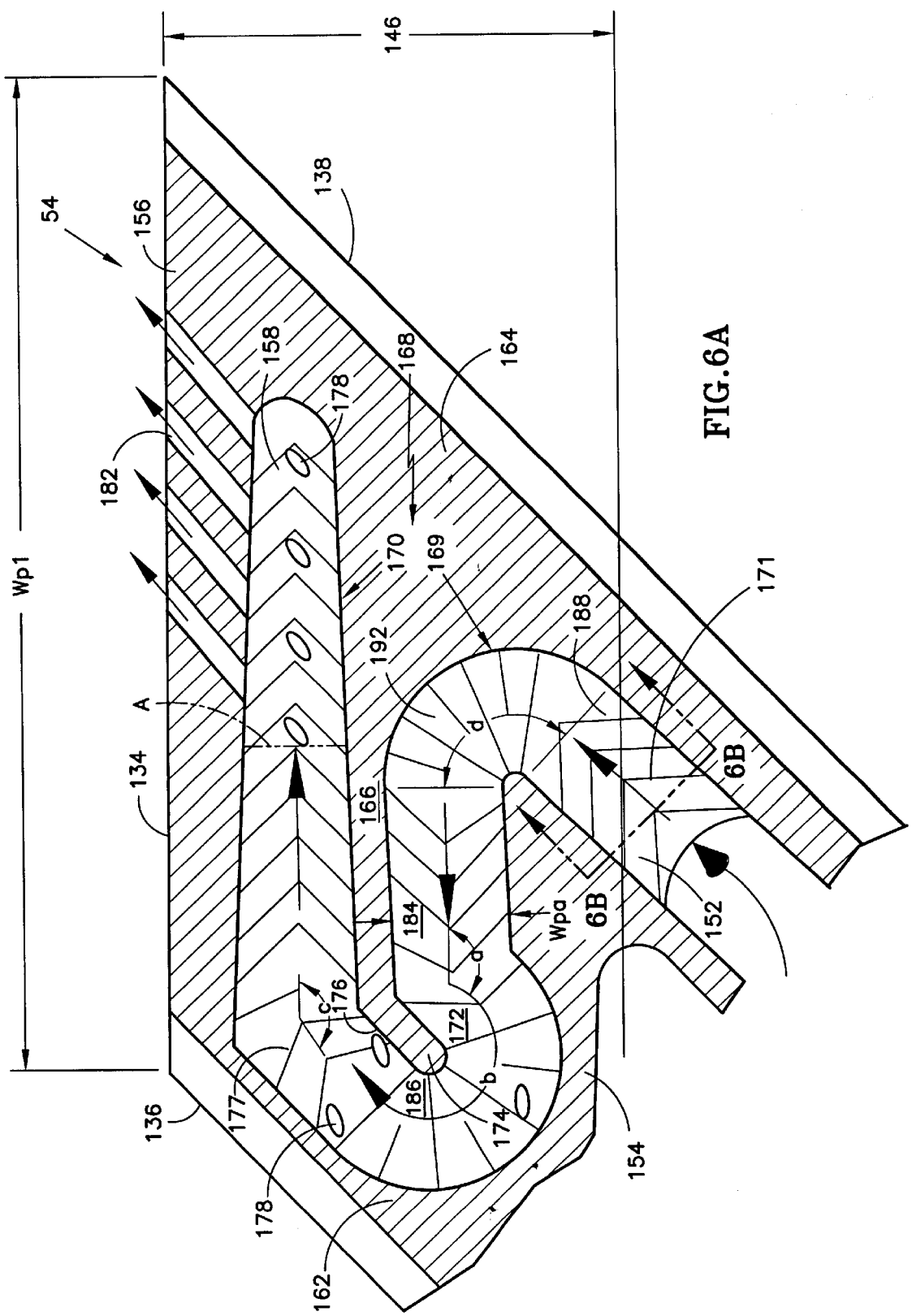
FIG. 6A is view from below and partially broken away of the trailing edge region of the stator vane shown in FIG. 5.

FIG. 6A is a view from below of the inner platform 54 of the stator vane 46 taken in the direction of the arrow 6 of FIG. 5. The platform is broken away to show the trailing edge region 146 of the platform. The platform has a first wall 154 in the trailing edge region which extends laterally between the sides. The first wall has the opening 152 which adapts the platform to be in flow communication with the inner plenum 76. The platform has a second wall 156 adjacent the trailing edge 134 which extends laterally between the sides 136, 138 and is spaced axially from the first wall leaving a cavity 158 for cooling fluid therebetween. The cavity is bounded in the spanwise direction by a pair of spanwisely facing walls, one wall 160 of which is shown in FIG. 5. The wall is spaced spanwisely from the gas path surface 56. The platform has a suction side wall 162. The suction side wall extends from the first wall 154 to the second wall 156 to laterally bound the cavity 158 on the suction side of the platform. A portion of the suction side wall extends substantially parallel to the suction side 136 of the vane platform. A pressure side wall 164 extends from the first wall to the second wall to laterally bound the cavity on the pressure side.

The pressure side wall 164 has a single rib 166 which extends laterally from the pressure side wall toward the suction side wall 136. The rib is spaced axially from the first wall 154 and the second wall 156 to form a serpentine passage 168 in the cavity 158 for cooling fluid. The passage has a first (forward) pass 169 and a rear pass 170 which extend in generally lateral directions across the platform. A plurality of trip strips 171 are disposed in the passage on the wall 160 as shown in FIG. 5 under the gas path surface 56. The trip strips are straight or chevron shaped. The passage has a length L as measured along the centerline of the passage which is less than or equal to one and one fourth the width of the platform Wpl (L≦1.25 Wpl). The passage has a width Wpa as measured perpendicular to the centerline of the passage. The width is relatively wide and in a range of ten percent to fifteen percent of the width Wpl of the platform (0.1 Wpl≦Wpa≦0.15 Wpl).

The rib 166 is spaced axially from the first wall 154 and laterally from the suction side wall 162 leaving a first turn region 172 therebetween. The rib has a projection 174 which is angled toward the first wall and toward the direction of the on-coming flow of cooling air under operative conditions. The angled projection causes the passage to turn through an acute angle a. The first turn region thereafter has an additional turn through an angle b of one hundred and eighty degrees.

The projection 174 has a wall 176 parallel to the suction side wall 162 which extends substantially parallel to the suction side 136 of the airfoil and parallel to the suction side wall. The two walls 162, 176 direct flow in the passage 168 against the second wall 156 adjacent the trailing edge 134 at a location adjacent the suction side of the platform and the flow passes through a second turn region 177 having an acute angle c.

As shown in FIG. 6A, a plurality of exit conduits 178, 182 are adapted to flow cooling fluid from the passage to the exterior of the platform under operative conditions. The plurality of exit conduits includes at least one film cooling conduit, as represented by the film cooling conduits 178, which are in flow communication with the gas path surface 56 of the platform. The plurality of exit conduits includes at least one trailing edge conduit, as represented by the trailing edge conduits 182, which extends between the rear pass 170 of the passage and the trailing edge 134 of the stator vane.

In the embodiment shown, the rearmost portion of the passage (rear pass or rear leg 170) is in flow communication with the platform surface with four film cooling conduits 178 having a total cross sectional area Arfc and an associated flow characteristic Crfc under operative conditions. The total cross sectional area is a summation of the areas of the four film cooling conduits. In addition, a portion of the passage upstream of the rearmost leg is in flow communication of the surface of the platform through three film cooling conduits 178 located in the first turn region 172 having a total cross sectional flow area Apfc and an associated flow characteristic Cpfc under operative conditions. Accordingly, only seven film cooling conduits extend from the interior of the platform to the exterior of the inner platform with the balance of the flow exiting through other exit conduits in the trailing edge which are not in flow communication with the gas path surface of the platform. The other exit conduits are the four trailing edge conduits 182 having a total cross sectional flow area Arte and an associated flow characteristic Crte for discharging cooling fluid entering the rear leg at the trailing edge. The areas are selected for the embodiment shown in FIG. 6A so that total cross sectional area Arte is equal to about seven percent (7%) of the cross sectional flow area Arpa of the last leg at a location A adjacent the first of the exit conduits (either exit conduit 178 or 182 of the last leg). The area of the film cooling holes Arfc extending to the gas path surface from the rear leg is about six percent (6%) of the cross sectional flow area Arpa of the rear leg. The cross sectional flow area Apfc of the film cooling holes in the first turn region is about five percent (5%) of the cross sectional flow area Arpa of the rear leg.

The rib and the walls cooperate to form a plurality of legs disposed in serial fashion with respect to each other. The legs of the passage receive the flow as the flow moves through the passage and yet the flow passes through these plurality of legs while only undergoing two passes through the trailing edge region of the platform. The legs include a first leg 184, a second leg 186, the rearmost or rear leg 170, and a fourth leg 188. The rear leg is coextensive with the rear pass.

The first leg is disposed at an angle α(α=a+b) to the downstream adjacent second leg. The rear leg is the rearmost leg of the passage and is disposed at an angle c to the upstream adjacent leg. In this particular embodiment, the upstream adjacent leg is the second leg 186. The rear leg extends laterally across over half the width Wpl of the platform as measured parallel to the trailing edge 134.

Figure 6B:
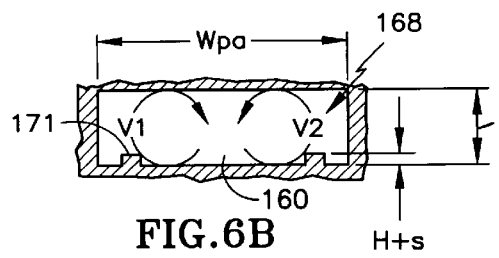
FIG. 6B is a cross-sectional view along the lines 6B—6B of FIG. 6A with portions of the vane broken away.

The fourth leg places the opening 152 which extends through the first wall 154 in flow communication with the first leg. Accordingly, the fourth leg forms an entrance section of the passage. FIG. 6B is a cross sectional view of the passage 168 taken through the fourth leg along the line 6B—6B. The passage has a width Wpa of about two hundred thousandths of an inch (0.200 inches) and a height Hpa of about one hundred thousandths of an inch (0.100 inches). The passage generally has an aspect ratio Hpa/Wpa which is about one half.

The fourth leg is adjacent the pressure side wall of the platform and extends substantially parallel to the pressure side 138 of the platform. A third turn region 192 is disposed between the fourth leg and the first leg. The passage turns through an angle d which is greater than ninety degrees (90°) in the third turn region. After the third turn region, the passage extends along the first, straight leg. As mentioned above, the first turn region sequentially connects the first leg to the second leg. The first turn region causes the passage to turn through angles whose summation is greater than one hundred and eighty degrees (180°). The first turn region is followed by the straight second leg of the passage and then by the second turn region between the second leg and the rear leg. The second turn region causes the passage turn through an acute angle which is greater than forty-five degrees (45°).

Figure 6C:
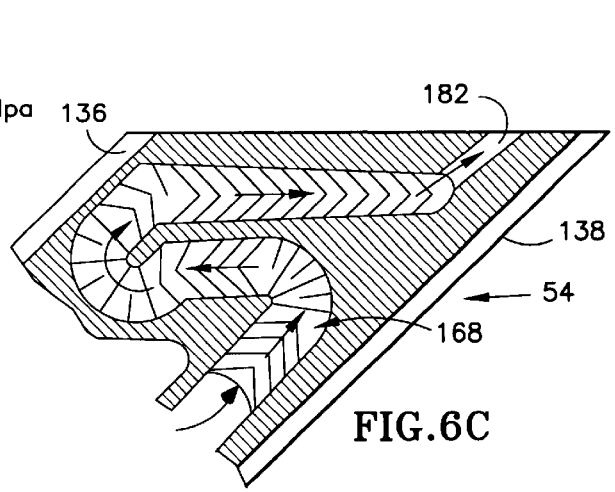
FIG. 6C is an alternate embodiment of the embodiment shown in FIG. 5 A.

FIG. 6C is an alternate embodiment of the inner platform 54 shown in FIG. 6A having a single trailing edge conduit 182 in flow communication with the trailing edge. In other respects, it is the same as the embodiment shown in FIG. 6A. The cooling air exits in a jet or stream under pressure, closely adjacent to the pressure side 138 of the airfoil and closely adjacent to the suction side of the adjacent airfoil.

Figure 6D:
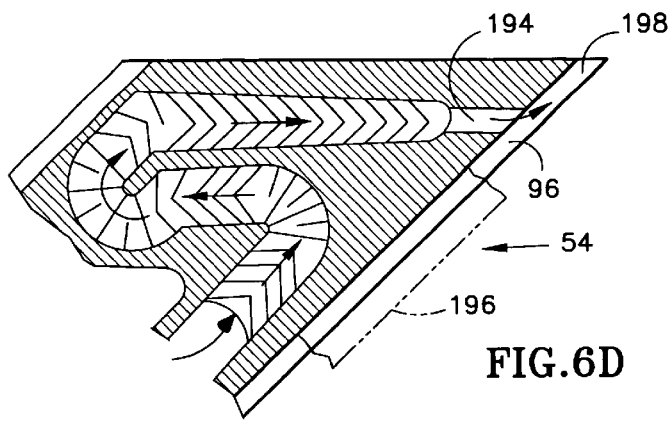
FIG. 6D is an alternate embodiment of the embodiment shown in FIG. 5A.

FIG. 6D is an alternate embodiment of the inner platform 54 shown in FIG. 6A. The platform has a single trailing edge conduit 194 which extends laterally to the extension 96 of the feather seal slot. No feather seal is disposed in the extension of the feather seal slot. As a result, the feather seal 196 in cooperation with the adjacent extension of the feather seal slot 96 (such as 96a and 96b) forms a trailing edge conduit 198 in both platforms which extends rearwardly to the trailing edge 134a and 134b of both adjacent vanes 46a and 46b.

Figure 7A:
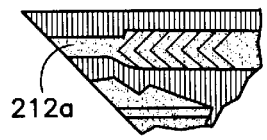
FIG. 7A is an alternate embodiment of the embodiment shown in FIG. 7.
Figure 7:
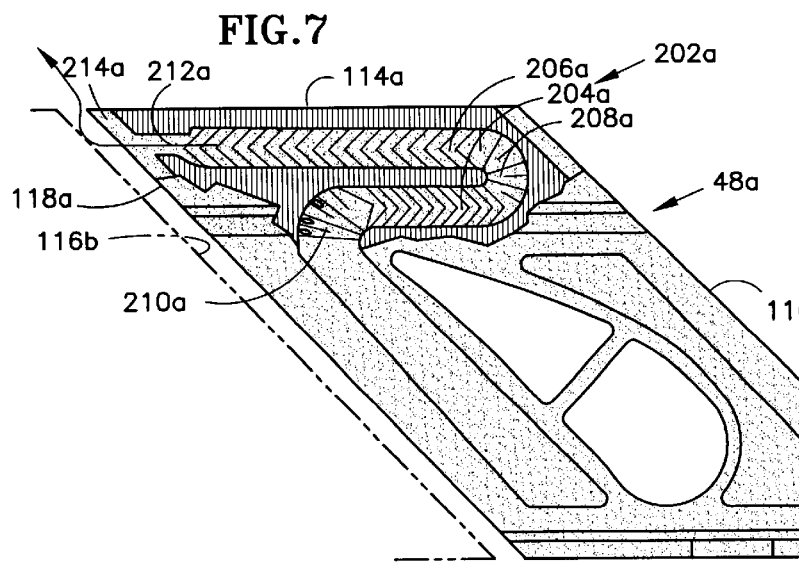
FIG. 7 is a view from above as shown by the direction arrow 7 of the trailing edge region of the outer platform of the stator vane.

FIG. 7 is a cross-sectional view from above of the outer platform 48 in the trailing edge region 126 and is taken in the direction shown by the arrow 7 of FIG. 5. As shown in FIG. 7, the outer platform has a passage 202 in the trailing edge region which makes two passes, 204, 206 passing through a first turn region and a second turn region. The passage rapidly tapers laterally in the rear leg and terminates at a lateral conduit 212 which extends laterally as did the trailing edge conduit of the embodiment shown in FIG. 6D. The extension 88 of the feather seal slot forms a trailing edge conduit 214 which is similar to the trailing edge conduit 198 of FIG. 6D.

FIG. 3 is the perspective view discussed above of portions of the two adjacent stator vanes 46a, 46b shown in FIG. 4. FIG. 3 shows the relationship of the feather seal slots 84, 86 and the extension 88 of the feather seal slot to the laterally extending conduit 212 shown in FIG. 7. As shown FIG. 7 and FIG. 3, the conduit extends on the pressure side 118 of the vane 46a. The conduit is in flow communication with the extensions 88a, 88b of the feather seal slot. The feather seal member 98 seals off the upstream end of the extension. The feather seal member and the extension forms the trailing edge conduit 214a, b which extends to the trailing edge 114 for ducting cooling fluid rearwardly after the cooling air is flowed out of the rear leg or pass 206 of the outer platform 48.

During operation of the gas turbine engine 10 shown FIG. 1, working medium gases are flowed along the primary flow path 18 of the engine and through the combustion section 14. The working medium gases contain oxygen which is burned with fuel to raise the temperature of the gases. These hot gases are expanded through the turbine section 16 passing through the array of stator vanes 46 immediately downstream of the combustion section 14. Boundary layers of working medium gases form on the gas path surfaces 52, 56 of the outer platform 48 and the inner platform 54.

Cooling air from the compression section 12 is flowed to the annular inner plenum 76 adjacent the inner platform 54. The cooling air is flowed in two passes 169, 170 through the legs 188, 186, 184, and 170 of the passage in the trailing edge region 146 of the platform. The cooling air convectively cools the airfoil and to some extent is used for film cooling. The flow characteristics of the passage Cpa, of the film cooling conduits Cpfc, Crfc and of the trailing edge conduits Crte are established to establish baseline cooling air flows for the durability condition of the stator vane. In this embodiment, the flow of cooling air for the durability condition of the vane follows closely the flow required at the Sea Level Take Off condition of the engine (SLTO). At this condition, at least half the cooling air entering the pressure side opening of the vane is flowed through the passage. In this particular embodiment, about sixty percent of the cooling air enters the passage.

As the cooling air is flowed through the passage, over sixty percent of the cooling air entering the passage is discharged through the rear leg of the passage adjacent the trailing edge. In the embodiment shown, about three fourths (¾) of the air is so discharged.

Only about one fourth (¼) of the cooling air entering the passage 168 is discharged in the first turn region 172. The cooling air is discharged through the three film cooling conduits 178 on an upstream portion of the platform. The discharge in this location is more intrusive into the boundary layer which forms on the adjacent gas path surface 56 than discharge from film cooling conduits adjacent the trailing edge. It is desirable to avoid discharging cooling air into this part of the boundary layer because of the adverse effect such intrusion has on the aerodynamic efficiency of the stator vanes. The four film cooling conduits 178 extending outwardly from the trailing edge pass (rear leg 170) have less of an effect on the aerodynamic efficiency because their intrusion into the flow path only disturbs a small portion of the boundary layer on the platform in a less critical location at the rear of the stator vane.

Accordingly, as the flow of cooling air passes through the passage, approximately seventy percent (70%) to eighty percent (80%) of the flow is discharged through conduits 178, 182 in the rear leg 170 of the passage.

Flow characteristics of the trailing edge conduits and the film cooling conduits Crfc and Crfe in the rear leg are established so that about half (fifty five percent (55%)) of the flow entering the rear leg is discharged through the trailing edge conduits 182 and about half (forty five percent (45%)) of the flow is discharged through the film cooling conduits 178. The expected range of flow for the trailing edge conduits is about forty to sixty percent of flow entering the rear leg with the balance being discharged through the film cooling conduit. In addition, the flow characteristic of the film cooling holes upstream of the rear leg are selected such that only about twenty five percent (25%) (that is, twenty to thirty percent) of the flow entering the passage is discharged through the three film cooling conduits 178 in the first turn region 172. This combination of film cooling conduits and trailing edge conduits provides a smaller level of film and convective cooling flow through the conduits to the suction side of the stator vane than the level of flow film and convective cooling to the trailing edge in the in the rear leg 170 of the vane.

The cooling air discharged through the trailing edge conduits is discharged rearwardly in a location which is closer to the pressure side 138 of the inner platform 54. The flow has a component of velocity in the direction of rotation of the rotor blades 36 of the adjacent rotor assembly 32. The flow characteristic Crte of the trailing edge conduits ensures that the cooling air exits in jets or streams under pressure that punch through the boundary layer that forms at the trailing edge 114 of the platform. The jets send a film of cooling air that extends over the platforms 38 of the downstream rotor blades. This provides film cooling to the rotor blades by shielding a portion of the platform of the rotor blades from the hot working medium gases. Accordingly, by discharging about forty percent of the flow of cooling air through the trailing edge conduits, less than thirty percent (30%) of the air entering the passage 168 is discharged in the first turn region 172 to the gas path surface of the platform with about one-third ($\frac{1}{3}$) being discharged through film cooling holes in the rear leg. As mentioned, this reduces the intrusion of the film cooling air into the boundary layer formed on the gas path surface with a beneficial effect on the aerodynamic efficiency of the stage of stator vanes.

A particular advantage of the present invention is the convective heat transfer which takes place internally between the suction side of the platform because of the sequence of turns that the cooling air goes through as it flows through the first turn region 172. The aerodynamic effects of the turn increase convective heat transfer by causing entrance effects in the flow. The increased convective heat transfer in this section of the platform bolsters the effect on platform temperature that the film cooling provides through the three film cooling conduits. These entrance effects continue and are intensified by the projection 174 and the remainder of the turn. The summation of the angle of the turn is greater than one hundred and eighty (180) degrees and includes the angle a through which the flow moves as the flow is directed toward the projection 174 on the rib 166. The disruption of flow by the projection greatly increases turbulence in the flow increasing the convective heat transfer coefficient and providing a level of convective heat transfer on the suction side of the airfoil which enables accepting the level of film cooling provided by the three film cooling conduits in this portion of the platform. The flow then passes through the second leg 186 which reorients the flow and directs the flow toward the acute angle turn at the second (trailing edge) wall 156. This urges the flow to again move toward the suction side in the trailing edge and into the corner to transfer heat from the platform to the cooling fluid in this region of the platform. Thereafter, the flow proceeds laterally through the rear leg.

The rear leg has chevron shaped trip strips 171 which extend on the gas path wall 160 across the width of the passage 168. The trip strips are angled in the downstream direction away from the oncoming flow to promote formation of counterrotating vortices VI, V2 that scrub the gas path wall of the platform and increase the convective heat transfer coefficient. The passage is tapered in the lateral direction to increase the velocity of the flow and the Reynolds number (ratio of momentum forces to viscous forces in the fluid) as the flow moves along the rear leg to increase the convective heat transfer coefficient. Flow is then discharged through the film cooling conduits 178 and the trailing edge conduits 182 as discussed above.

A particular advantage of the present invention is the use of just two passes 169, 170 to provide cooling in the trailing edge region 126 of the stator vane 46. The two passes, downstream of the rail 64, provide a temperature gradient between the cooling air and the walls of the platform which is greater in the first turn region than the temperature gradient in a multipass configuration having more than two passes through the trailing edge region. The length of the passage 168 (and consequent exposure of the cooling air to heat transfer area) prior to reaching the first turn region is one indicator of the effect of the number of passes on the temperature gradient between the wall and the cooling air at the first turn region. One non-dimensional measure of the length of the passage for heat transfer effects compares the length of the serpentine passage in the trailing edge region compared to the width of the trailing edge region. The length of the passage 168 is less than one and half times the width Wpl of the platform and, in the construction shown, is less than one and one quarter times the width of the platform. In addition, the height to width aspect ratio of the passage is relatively low. The passage has a height to width ratio of the passage which is about one half in the untapered portion.

The present invention has created a relatively short, relatively wide passage having large turns and projecting structure in critical regions of the platform to reduce the amount of cooling air being flowed into the gas path surface of the airfoil with a concomitant benefit on the aerodynamic efficiency of the stator vane. The size of the passage also facilitates in casting the passage as compared to constructions that have many narrower passes.

As shown in FIG. 7, cooling air is discharged from stator vane outer platform 48a laterally from the conduit 212 against the suction side 116b of the adjacent stator vane 48b and then rearwardly to provide film cooling to the downstream array of rotor blades. A particular advantage of this configuration is that cooling air from the pressure side of one stator vane is used for impingement cooling of the suction side of the adjacent stator vane which again reduces the need to provide film cooling holes to the gas path surface of the adjacent stator vane at an upstream location. The method of cooling the pair of stator vanes thus includes the steps of forming a platform 48 on a first stator vane 46a and a platform 48b on the adjacent (second) stator vane 46b which each have feather seal slots 86a, 86b and an extension 88a, 88b of the feather seal slots. The step of forming the feather seal slot follows with an extension of the slot to the trailing edge of one or both of the stator vanes. The slot may be formed by a machining operation such as electrodischarge machining (EDM) or grinding. It is a simple matter to continue the slot rather than specially forming another slot in the side of the platform.

Accordingly, a particular advantage of this embodiment of the method of cooling the stator vane and the downstream rotor blade is the simplicity which the trailing edge conduit is constructed by merely forming the extension the formation of the feather seal slot. The feather seal slot, instead of terminating shortly after the intersection with the radial feather seal slot, is merely extended during the machining process.

The next step in the embodiment shown is forming a radially (spanwisely) extending feather seal slot 84 in the rail extending from the platform. The radial feather seal slot intersects the first feather seal slot. A feather seal member 98 is disposed in the slot which has a first leg 102 disposed in the first feather seal slot 86a, 86b which does not extend into the trailing edge extension 88a, 88b of the airfoil. The feather seal member 98 has the second leg 104 which is integral with the first leg which extends radially. The feather seal member is thus disposed in the second feather seal slot trapping the feather seal member in the axial direction.

The method includes forming an exit conduit 212a on the interior of the platform which includes the rear leg 206 extending across the platform adjacent the trailing edge for ducting cooling air from the first vane under operative conditions. The lateral flow in the lateral rear leg 206 aligns the flow with the exit conduit 212a and the flow passing through the conduit. The method includes directing the conduit so that flow under operative conditions in the exit conduit from a stream that impinges on the suction side 116b of the platform of the second vane. The term impinge means that the flow strikes or comes in close proximity with the side to provide impingement cooling to the side.

The method includes flowing the cooling air rearwardly in the trailing edge conduit 214 formed by the slots to form a jet of cooling air in the extension of the feather seal slot. The jet or stream of cooling air is directed at adjacent downstream structure to provide film cooing to the downstream structure. In an alternate embodiment, the method of forming a cooling passage using an extension of the feather seal slot would include blocking the end of the feather slot at the extension to trap rearward movement of the feather seal member in the feather seal slot or machining an equivalent of the extension from the trailing edge of each platform which does not reach the feather seal slot. As shown in FIG. 7A, the extension of the slot might be formed in only one stator vane platform, such as the platform 48b with no extension in the platform 48a.

A particular advantage of the present invention is the heat transfer which results from impinging the cooling air from passage 212a against the facing suction side 116b of the adjacent airfoil. The effect is further intensified on the suction side of platform 48b by the platform structure bounding the extension 88b of the feather seal slot. The structure bounding the slot extends laterally from the thicker portion of the platform, acting to form a low aspect ratio channel which increases the heat transfer coefficient by decreasing the hydraulic diameter.

Under some operative conditions, the gap G will open slightly allowing cooling air to discharge outwardly through the gap G. This provides film cooling to the suction side and pressure side of the platform. A particularly severe operating condition of the engine is the sea level takeoff (SLTO) operating condition. At this condition, the engine accelerates rapidly from the idle thrust condition to a very high thrust condition for sea level takeoff. The gap G between adjacent stator vanes at idle is relatively small in comparison to the gap G which occurs during the cruise condition. The gap G at cruise results from the outer case moving outwardly in response to heat transfer to the outer case from the working medium flowpath 18 and moving the array of stator vanes to a larger diameter. The sudden increase in the volume of hot, working medium gases at sea level takeoff passing from the combustion chamber to the turbine section causes a rapid increase in the temperature of the surfaces of the rotor blades immediately adjacent the flowpath. At the same time, the rotor blades experience transient forces as the rotational speed of the rotor assembly rapidly increases. Only a small amount of cooling air is lost through the feather seal slots at that operating condition. As a result, the air is more confined to the extension of the feather seal slot than at cruise. The cooling air is directed rearwardly to form circumferentially spaced jets of cooling air. A film of cooling air develops as the rotor blades pass by the jets of cooling air and decreases heat transfer to the leading edge of the platform of the downstream rotor blades. In the steady state condition, the gap G opens more than at sea level takeoff and part of the cooling air then flows outwardly to form a film of cooling air to protect the surfaces of the stator vane and the remainder film cools the rotor blades.

Although the invention has been shown and described with respect to detailed embodiment thereof, it should be understood by those skilled in the art that various changes in form and detail thereof may be made without departing from the spirit and the scope of the claimed invention.

We claim:

1. A coolable stator vane for a rotary machine having an axis A and a flowpath for working medium gases, the stator vane being adapted to be in flow communication with a supply plenum for a cooling fluid, the stator vane having an airfoil extending radially outwardly into the working medium flowpath, the airfoil having a leading edge, a trailing edge and flow directing surfaces which extend between the edges and which include a suction surface and a pressure surface, the stator vane having a rearmost rail adjacent the trailing edge which adapts the stator vane to engage a support, and further having structure which bounds the working medium flowpath, which comprises:

a platform having a gas path surface for bounding the flowpath which has
  a leading edge and a trailing edge which is spaced axially from the leading edge of the platform,
  a suction side and a pressure side which is spaced laterally from the suction side,
  a leading edge region forward of the airfoil, a midchord region from which the airfoil extends, and a trailing edge region extending rearwardly from the rearmost rail of the stator vane,
  a first wall in said trailing edge region which extends laterally between the sides, the first wall having an opening which adapts the platform to be in flow communication with said plenum,
  a second wall adjacent the trailing edge of the platform which extends laterally between the sides and which is spaced axially from the first wall leaving a cavity for cooling fluid therebetween,
  a pressure side wall which extends adjacent the pressure side of the vane platform from the first wall to the second wall to bound the cavity,
  a suction side wall which extends adjacent the suction side of the vane platform from the first wall to the second wall to bound the cavity and
  a rib which extends laterally from the pressure side wall toward the suction side wall and which is spaced axially from the first wall and the second wall to form a serpentine passage in the cavity for cooling fluid, the passage having a first pass and a second pass, the rib being spaced axially from the first wall and laterally from the suction side wall leaving a first turn region therebetween; and,
  a plurality of exit conduits which are adapted to duct the cooling fluid from the passage to the exterior of the platform, the plurality of exit conduits including at least one film cooling conduit in flow communication with the gas path surface of the platform and at least one trailing edge conduit which extends between the serpentine passage and the trailing edge of the platform;

wherein the rib and the walls cooperate to form the serpentine passage having said two passes and legs disposed in serial fashion with respect to each other for sequentially receiving the flow of cooling fluid as the flow moves through the serpentine passage, the second pass adjacent the trailing edge of the platform receiving cooling fluid which has been heated during the first pass through an upstream portion of the trailing edge region of the platform; wherein a portion of the passage upstream of the rearmost pass is in flow communication with the surface of the platform through at least one film cooling conduit having a total cross sectional flow area Apfc and an associated flow characteristic Cpfc under operative conditions;

wherein the rearmost pass is in flow communication with the platform surface through at least one film cooling conduit having a total cross sectional area Arfc and an associated flow characteristic Crfc under said operative conditions and is in flow communication with the trailing edge of the platform through at least one trailing edge conduit having a total cross sectional flow area Arte and an associated flow characteristic Crte for discharging cooling fluid entering the rearmost pass at the trailing edge of the platform; and, wherein the areas and associated flow characteristics are established such that more than sixty percent of the cooling fluid entering the serpentine passage is flowed from the rearmost leg to the exterior of the platform for cooling adjacent turbine structure and providing film cooling to the trailing edge of the platform such that less than forty percent of the cooling fluid entering the serpentine passage is injected upstream of the rearmost leg into the flowpath for working medium gases under an operative condition of the engine and wherein the turn region is located at a location adjacent the suction side wall of the platform to increase convective cooling at this location.

2. The coolable stator vane as claimed in claim 1 wherein the suction side and the pressure side are spaced apart by a width Wpl as measured along a line parallel to the trailing edge of the platform, and wherein the serpentine passage has a width Wpa as measured perpendicular to the centerline of the serpentine passage which is in a range of ten percent to fifteen percent of the width Wpl of the platform (0.1 Wpl≦Wpa≦0.15 Wpl), and has a length L as measured along the centerline of the passage which is less than or equal to one and one half the width of the platform Wpl (L≦1.5 Wpl).

3. The coolable stator vane as claimed in claim 1 wherein the first turn region sequentially connects the first pass to the second pass such that the passage turns through angles whose summation is greater than one hundred and eighty degrees to provide convective heat transfer in said turn region.

4. The coolable stator vane as claimed in claim 3 wherein the rib has a projection in the first turn region which is angled toward the first wall and the direction of the on-coming flow under said operative conditions to turn the passage through an acute angle, the turn region thereafter having a turn of one hundred and eighty degrees, the projection on the rib providing heat transfer from the platform to the cooling fluid as the flow turbulently interacts with the projection which is inclined toward the oncoming flow for diverting the flow into the first turn region.

5. The coolable stator vane as claimed in claim 4 wherein the projection has a wall parallel to part of the suction side wall, the wall on the projection extending substantially parallel to the suction side of the airfoil and parallel to said part of the suction side wall for directing flow in the passage against the second wall adjacent the trailing edge at a location adjacent the suction side of the platform.

6. The coolable stator vane as claimed in claim 5 wherein the walls and the rib form said legs which includes a first leg between the rib and the first wall, a second leg between the projection of the rib and the suction side wall, and a rear leg between the rib and the second wall, the first leg being disposed at an angle to the downstream adjacent second leg, the rear leg being the rearmost leg of the passage and disposed at an angle to the upstream adjacent leg forming a second turn region and extending laterally across over half the width Wpl of the platform as measured parallel to the trailing edge of the platform, and further includes a fourth leg adjacent to the opening of the passage, the fourth leg being adjacent the pressure side wall of the platform and extending substantially parallel to the pressure side wall of the platform.

7. The coolable stator vane as claimed in claim 1 wherein the rear pass is decreasingly tapered in width as the rear pass extends laterally toward the pressure side of the platform.

8. The coolable stator vane as claimed in claim 6 wherein the passage has a third turn region which sequentially connects the fourth leg and the adjacent upstream leg such that the passage turns through angles whose summation is greater than ninety degrees.

9. The coolable stator vane as claimed in claim 1 wherein the rib has a projection in the first turn region which is angled toward the first wall and the direction of the on-coming flow under said operative conditions to turn the passage through an acute angle, the turn region thereafter having an additional turn of one hundred and eighty degrees, the projection on the rib providing heat transfer from the platform to the cooling fluid as the flow turbulently interacts with the projection which is inclined toward the oncoming flow for diverting the flow into the first turn region.

10. The coolable stator vane as claimed in claim 9 wherein the projection has a wall parallel to the suction side wall which extends substantially parallel to the suction side of the airfoil and parallel to part of the suction side wall for directing flow in the passage against the second wall adjacent the trailing edge at a location adjacent the suction side of the platform.

11. The coolable stator vane as claimed in claim 1 wherein the cross sectional flow areas Apfc, Arfc and Arte of the conduits each lie in a range of about four to ten percent of the cross sectional flow area Arpa of the rear leg at a location adjacent the exit conduit of the rear leg that is first reached by the flow of cooling fluid.

12. The coolable stator vane as claimed in claim 11 wherein the summation of the cross-sectional areas Apfc, Arfc and Arte of the conduits is less than twenty five of percent the cross sectional flow Arpa of the last leg such that the rear leg receives more than sixty percent of the cooling flow entering the serpentine passage for providing film cooling to the downstream platforms of the adjacent rotor blades and wherein less than fifty percent of the cooling fluid entering the serpentine passage is injected upstream of the rear pass into the flowpath for working medium gases under at least one operative condition.

13. The coolable stator vane as claimed in claim 1 wherein the flow characteristics are established such that less than about thirty percent of the flow in the passage is discharged through the film cooling conduits upstream of the rearmost pass in the platform and more than about seventy percent of the flow is discharged through exit conduits in the rearmost pass in the platform under at least one operative condition.

14. The coolable stator vane as claimed in claim 13 wherein about twenty five percent of the flow in the passage is discharged through the film cooling conduits upstream of the rearmost pass in the platform and about seventy five percent of the flow is discharged through exit conduits in the rearmost pass in the platform under at least one operative condition.

15. The coolable stator vane as claimed in claim 13 wherein the flow discharged through the trailing edge conduits is in a range of about forty to sixty percent of the flow entering the rearmost pass and wherein the flow discharged through the film cooling conduits in the trailing edge region is in a range of about forty to sixty percent of the flow entering the rearmost pass in the platform.

16. The coolable stator vane as claimed in claim 13 wherein the flow discharged through the trailing edge conduits for the rearmost pass is greater than the flow discharged through the film cooling conduits for the rearmost pass.

17. A coolable stator vane for a rotary machine having an axis A and a flowpath for working medium gases, the stator vane being adapted to be in flow communication with a supply plenum for a cooling fluid, the stator vane having an airfoil extending radially outwardly into the working medium flowpath, the airfoil having a leading edge, a trailing edge and flow directing surfaces which extend between the edges and which include a suction surface and a pressure surface, the stator vane having a rearmost rail adjacent the trailing edge which adapts the stator vane to engage a support, and further having structure which bounds the working medium flowpath, which comprises:

a platform having a gas path surface for bounding the flowpath which has
a leading edge and a trailing edge which is spaced axially from the leading edge of the platform by a length Cr as measured in the axial direction perpendicular to the trailing edge of the platform,
a suction side and a pressure side which is spaced laterally from the suction side by a width Wpl as measured along a line parallel to the trailing edge of the platform, each side extending from the leading edge to the trailing edge of the platform,
a leading edge region forward of the airfoil, a midchord region from which the airfoil extends, and a trailing edge region extending rearwardly from the rearmost rail of the stator vane,
a first wall in said trailing edge region which extends laterally between the sides, the first wall having an opening which adapts the platform to be in flow communication with said plenum,
a second wall adjacent the trailing edge of the platform which extends laterally between the sides and which is spaced axially from the first wall leaving a cavity for cooling fluid therebetween,
a pressure side wall which extends from the first wall to the second wall to bound the cavity,
a suction side wall which extends substantially parallel to the suction side of the vane platform from the first wall to the second wall to bound the cavity and
a single rib which extends laterally from the pressure side wall toward the suction side wall and which is spaced axially from the first wall and the second wall to form a serpentine passage in the cavity for cooling fluid, the passage having a length L as measured along the centerline of the passage which is less than or equal to one and one fourth the width of the platform Wpl (L≦1.25 Wpl) and which has a width Wpa as measured perpendicular to the centerline of the passage which is in a range of ten percent to fifteen percent of the width Wpl of the platform (0.1 Wpl≦Wpa≦0.15 Wpl), the rib being spaced axially from the first wall and laterally from the suction side wall leaving a first turn region therebetween, the rib having
a projection which is angled toward the first wall and the direction of the on-coming flow under operative conditions to turn the passage through an acute angle, the turn region thereafter having an additional turn of one hundred and eighty degrees, the projection having a wall parallel to part of the suction side wall which extends substantially parallel to part of the suction side of the airfoil and parallel to the suction side wall for directing flow in the serpentine passage against the second wall adjacent the trailing edge of the platform at a location adjacent the suction side of the platform;
a plurality of exit conduits which are adapted to flow the cooling fluid from the serpentine passage to the exterior of the platform, the plurality of exit conduits including at least one film cooling conduit in flow communication with the gas path surface of the platform and at least one trailing edge conduit which extends between the serpentine passage and the trailing edge of the platform;
wherein the rib and the remaining walls cooperate to form the serpentine passage having said two passes and a plurality of legs disposed in serial fashion with respect to each other for sequentially receiving the flow of cooling fluid as the flow moves through the serpentine passage, the second pass receiving cooling fluid which has been heated during the first pass in the trailing edge region of the platform,
wherein the plurality of legs includes a first leg between the rib and the first wall, a second leg between the projection of the rib and the suction side wall, and a rear leg between the rib and the second wall, the first leg being disposed at an angle to the downstream adjacent second leg, the rear leg being the rearmost leg of the passage and disposed at an angle to the second leg leaving a second turn region therebetween, the second passage extending laterally across over half the width Wpl of the platform as measured parallel to the trailing edge of the platform, and further includes a fourth leg adjacent to the opening of the serpentine passage, the fourth leg being adjacent the pressure side wall of the platform and extending substantially parallel to the pressure side wall of the platform;
wherein the first turn region sequentially connects the first leg to the second leg such that the passage turns through angles whose summation is greater than one hundred and eighty degrees to provide heat transfer in said turn region, the projection on the rib further providing heat transfer from the platform to the cooling fluid as the flow turbulently interacts with the projection which is inclined toward the oncoming flow for diverting the flow into the first turn region;
wherein the serpentine passage has a third turn region which sequentially connects the fourth leg and the adjacent upstream leg such that the passage turns through angles whose summation is greater than ninety degrees;
wherein a portion of the serpentine passage upstream of the rearmost leg is in flow communication with the surface of the platform through at least one film cooling conduit having a total cross sectional flow area Apfc and an associated flow characteristic Cpfc under operative conditions;
wherein the rear leg is in flow communication with the platform surface through at least one film cooling conduit having a total cross sectional area Arfc and an associated flow characteristic Crfc under said operative conditions and is in flow communication with the trailing edge of the platform through at least one trailing edge conduit having a total cross sectional flow area Arte and an associated flow characteristic Crte for discharging cooling fluid entering the rear leg at the trailing edge of the platform and wherein the cross sectional flow areas Apfc, Arfc and Arte of the conduits each lie in a range of about four to ten percent of the cross sectional flow Arpa of the rear leg at a location adjacent the first exit conduit of the rear leg; and wherein the summation of the cross-sectional areas Apfc, Arfc and Arte of the conduits is less than twenty five of percent the cross sectional flow Arpa of the last leg such that the rear leg receives more than fifty percent of the cooling fluid entering the serpentine passage for providing film cooling to the downstream platforms of the adjacent rotor blades and wherein less than fifty percent of the cooling fluid entering the serpentine passage is injected upstream of the rear leg into the flowpath for working medium gases under said operative conditions.

18. The stator vane having a passage according to claim 17 wherein the serpentine passage has less than four film cooling holes upsteam of the rear leg.

19. The stator vane having a passage according to claim 18 wherein said film cooling holes upstream of the rear leg are in flow communication with the first turn region.

20. The stator vane having a passage according to claim 18 wherein said rear leg has at least four film cooling holes in flow communication with the rear leg.

21. The stator vane having a passage according to claim 18 wherein said rear leg has at least four trailing edge cooling holes in flow communication with the rear leg.

* * * * *